(12) United States Patent
Lemke (10) Patent No.: US 6,477,026 B1
(45) Date of Patent: Nov. 5, 2002

(54) SINGLE PACKAGE SOLENOID HAVING CONTROL CIRCUIT

(75) Inventor: Dwight D. Lemke, Geneseo, IL (US)

(73) Assignee: Case Corporation, Racine, WI (US)

(*) Notice: Subject to any disclaimer, the term of this patent is extended or adjusted under 35 U.S.C. 154(b) by 24 days.

(21) Appl. No.: 09/610,562

(22) Filed: Jul. 5, 2000

(51) Int. Cl.$^7$ .............................................. H01H 47/00
(52) U.S. Cl. ....................................... 361/152; 361/142
(58) Field of Search .................................. 361/142, 152, 361/153, 154, 170, 179, 187; 701/50; 340/938, 435, 436, 684

(56) References Cited

U.S. PATENT DOCUMENTS

| 3,737,141 A | * | 6/1973 | Zeuner ................... 251/129.07 |
| 3,906,294 A | * | 9/1975 | Lourigan .................... 361/142 |
| 4,276,811 A | * | 7/1981 | Zeuner et al. ................. 60/422 |
| 4,382,241 A | * | 5/1983 | Hehl ........................... 361/142 |
| 4,401,009 A | * | 8/1983 | Zeuner et al. ................. 60/452 |
| 4,485,342 A | | 11/1984 | Hill et al. .................... 323/351 |
| 4,930,041 A | | 5/1990 | Elderton et al. ............ 361/190 |
| 5,245,501 A | | 9/1993 | Locher et al. .............. 361/154 |
| 5,347,419 A | | 9/1994 | Caron et al. ................ 361/154 |
| 5,450,270 A | | 9/1995 | Takahashi ................... 361/154 |
| 5,731,946 A | | 3/1998 | Kahr ........................... 361/154 |
| 5,790,364 A | | 8/1998 | Mikami et al. ............ 361/154 |
| 5,815,362 A | | 9/1998 | Kahr et al. ................. 361/153 |
| 5,818,679 A | | 10/1998 | Schustek et al. ............ 361/154 |
| 5,892,649 A | | 4/1999 | Kahr et al. ................. 361/154 |
| 5,914,850 A | | 6/1999 | Johansson ................... 361/187 |
| 5,933,313 A | | 8/1999 | Furukawa ................... 361/154 |

* cited by examiner

Primary Examiner—Ronald W. Leja (57) ABSTRACT

A single package solenoid includes a package, a solenoid coil, and a control circuit. The solenoid coil and the control circuit are contained in the package. The control circuit is coupled to the solenoid coil and has a control terminal. The control circuit is configured to power the solenoid coil based on a control signal received on the control terminal.

4 Claims, 6 Drawing Sheets

SINGLE PACKAGE SOLENOID HAVING CONTROL CIRCUIT

FIELD OF THE INVENTION

The present invention relates generally to the field of solenoids. More specifically, the present invention relates to the field of solenoids having control circuits.

BACKGROUND OF THE INVENTION

A solenoid is a device having a coil of wire and a metal core. Often used as a switch, the solenoid has two terminals extending from its package which are connected to either end of the coil of wire. When current is supplied through the coil of wire from one terminal to the other, a magnetic field causes the metal core to slide along a coil axis. A controller is provided in a separate package to selectively regulate current through the coil of wire.

Solenoids are used in a wide variety of applications, for example, to turn hydraulic valves on and off. In one application, solenoids are used to actuate hydraulic valves to control the header of an agricultural vehicle, such as, a harvester. On a harvester, solenoids are used to drive hydraulic valves which in turn regulate a flow of hydraulic fluid to hydraulic cylinders which, in turn, regulate the height of a header with respect to ground. Thus, the operator may command the header through control circuitry to raise or lower the header during harvesting depending on such factors as the terrain, the type of crop, etc.

One drawback of such a system is the amount of control circuitry needed to drive the solenoids. For example, for a system with multiple independently-controllable headers, a controller having various analog and/or digital inputs and outputs must be fabricated, programmed, and mounted to the harvester along with the necessary data wires, cables, etc. Such a system is prone to result in loose wires, and in any event involves a great deal of cost and complexity.

Accordingly, what is needed is a solenoid which reduces the need for complex control circuitry. Further, what is needed is a solenoid which can be controlled without the need for separate control circuitry.

SUMMARY OF THE INVENTION

According to one exemplary embodiment, a single package solenoid is disclosed having a package, a solenoid coil, and a control circuit. The solenoid coil and the control circuit are contained in the package. The control circuit is coupled to the solenoid coil and has a control terminal. The control circuit is configured to power the solenoid coil based on a control signal received on the control terminal.

According to another exemplary embodiment, a three-terminal solenoid is disclosed having a power terminal configured to receive a power signal, a ground terminal configured for coupling to a ground, and a control terminal configured to receive a control signal. The three-terminal solenoid further includes a circuit coupled to the power terminal, the ground terminal, and the control terminal configured to generate a magnetic field having a magnitude based on the control signal. A core is operable in response to the magnetic field.

According to yet another embodiment, a solenoid includes a package, a solenoid coil, and a control means for powering the solenoid coil in proportional response to a control signal, wherein the solenoid coil and the control means are contained in the package.

According to still another exemplary embodiment, a control system for controlling the position of a header of an agricultural vehicle with respect to the ground is disclosed. The control system includes a transducer coupled to the header configured to sense the position of the header with respect to the ground and to generate a header position signal. The control system further includes a single package solenoid having a package, a solenoid configured to adjust the position of the header, and a control circuit coupled to the solenoid. The control circuit has a control terminal coupled to the transducer and is configured to power the solenoid based on the header position signal received on the control terminal. The solenoid and the control circuit are contained in the package.

DETAILED DESCRIPTION OF EXEMPLARY EMBODIMENTS

Figure 1:
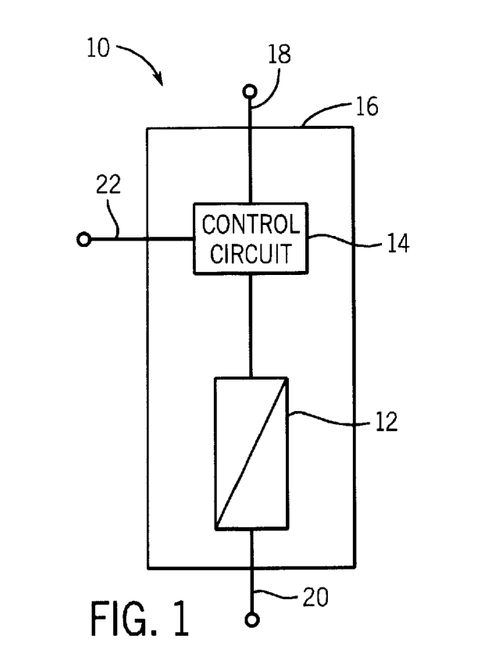
FIG. 1 is a schematic diagram of a single package solenoid according to an exemplary embodiment.

Referring first to FIG. 1, a single package solenoid 10 is shown according to an exemplary embodiment. Solenoid 10 includes a solenoid coil 12 and a control circuit 14 contained in a single package 16. Solenoid 10 further includes a core, or plunger (not shown) which is moved to one of a plurality of positions in response to a magnetic field generated by solenoid coil 12. Solenoid 10 further includes a power terminal 18 configured to receive power, for example, a direct current (DC) power signal, a ground terminal 20 configured for coupling to a ground, and a control terminal 22 configured to receive a control signal, thus making solenoid 10 a three terminal solenoid. Terminals 18, 20, and 22 extend from package 16. Package 16 may be of various sizes for a wide variety of applications, and is fabricated from any of a number of standard materials, such as, metals, plastics, polymers, etc., and may include various apertures, for example, to allow the core to move in and out of the packaging. Solenoid coil 12 may be fabricated from any of a number of standard materials and include any of a variety of numbers of turns, etc.

During operation, solenoid 10 is coupled to a power source at power terminal 18 and a ground at ground terminal 20. Control terminal 22 is coupled to a transducer or other circuit element external to package 16 which provides a control signal (e.g., a direct current signal, an analog signal, a pulse-width-modulated signal, etc.) to solenoid 10. Control circuit 14 receives the control signal and provides or regulates a flow of current from power terminal 18 through solenoid coil 12, the flow of current being based on the control signal. For example, in this exemplary embodiment, control circuit 14 is configured to regulate the flow of current proportional to the magnitude of the control signal. Alternatively, a non-proportional (e.g., logarithmic, etc.) control circuit may be implemented. Thus, control of solenoid coil 12 based on a sensed parameter received on control terminal 22 is provided within package 16, without the need for complex external control circuitry.

According to one alternative, the positions of control circuit 14 and solenoid coil 12 relative to power terminal 18 and ground terminal 20 may be reversed, such that control circuit 14 drains current through solenoid coil 12 to ground terminal 20.

Figure 11:
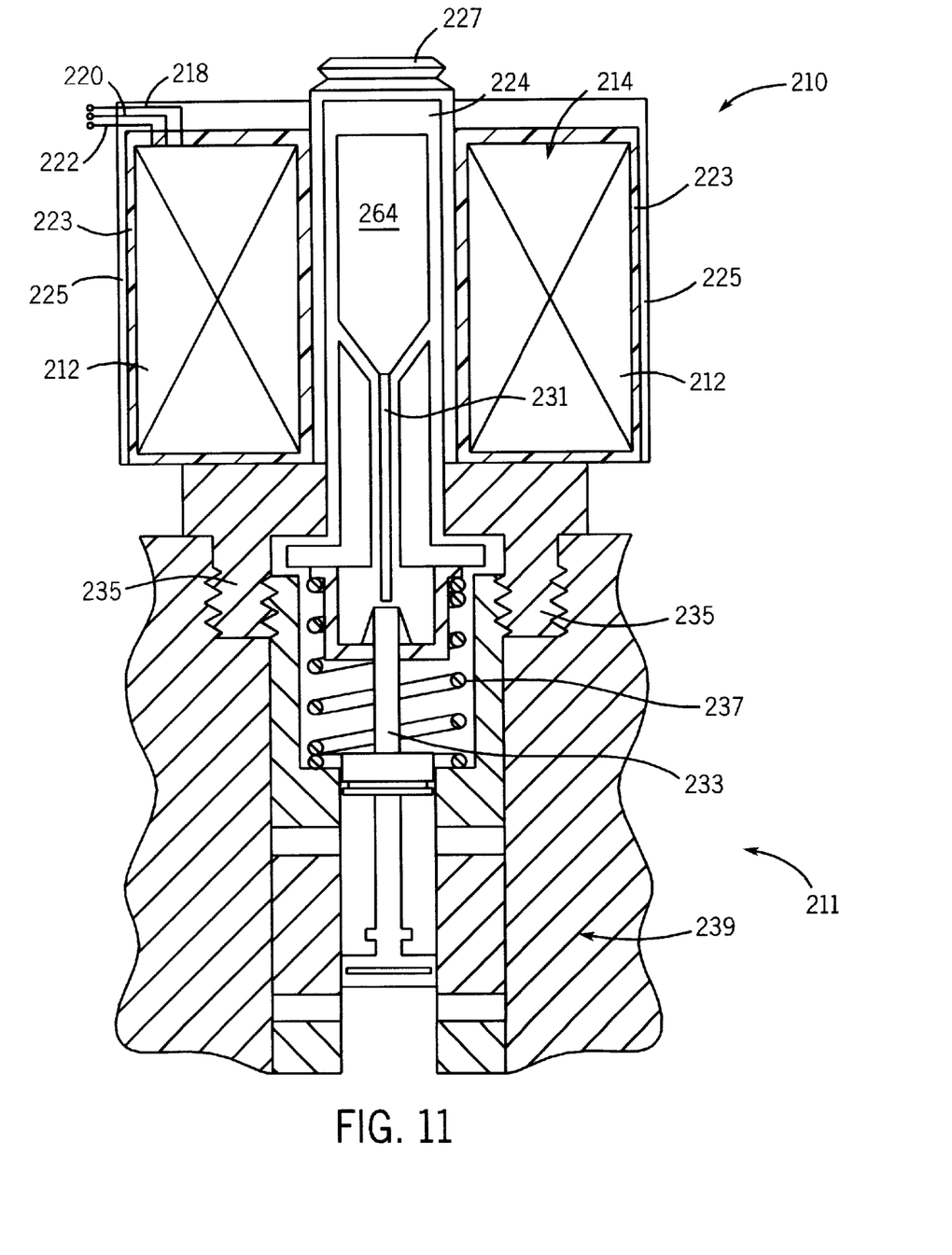
FIG. 11 is a cross-sectional view of the single package solenoid according to the exemplary embodiment of FIG. 1 coupled to a valve.

Referring now to FIG. 11, a cross-sectional view of a solenoid 210 according to the exemplary embodiment of FIG. 1 is shown coupled to a flow compensated solenoid valve 211. The various sizes and materials used for solenoid 210 are presented as merely exemplary, and will vary widely depending on the applications, needs of the system, costs of parts, etc. The size of solenoid 210 is dependent on such factors as the size of the solenoid coil, the forces needed, and the heat rise dissipation needed. Solenoid 210 is of generally cylindrical shape having a length of approximately 2.0 inches and an outer diameter of approximately 1.5 inches. Solenoid 210 further includes a control circuit 214 shown as a printed circuit board having a circular shape to match that of solenoid coil 212. Other shapes and board configurations, including discrete circuit elements, are contemplated. Control circuit 214 is coupled to solenoid coil 212 as described above with respect to FIG. 1, and further includes power terminal 218, ground terminal 220, and control terminal 222 which are coupled to control circuit 214 and extend outside of solenoid 210.

Solenoid 210 further includes an insulative encasement 223 (e.g., class "B", 130 degree Celsius epoxy) around solenoid coil 212. A shroud 225 (e.g., fabricated from iron or other metal) to reduce magnetic fringing encases insulative encasement 223. A nut 227 receives a bolt (not shown) to hold the shroud in place. Solenoid 210 further includes an armature or core 264, surrounded by an oil 229, slidable within oil 229 to actuate a pin 231 against a spool 233 of flow compensated solenoid valve 211. Solenoid 210 is threadably engageable to solenoid valve 211 by threads 235.

In operation, solenoid 210 functions similarly to solenoid 10 as described above. As control circuit 214 provides current to solenoid coil 212 in response to a control signal received on control terminal 222, the resulting magnetic field causes armature 264 to move down within oil 229, actuating pin 231 to move spool 233 downward against the force of a spring 237. A decrease in the current provided to solenoid coil 212 allows the force of spring 237 to move spool 233, pin, 241, and armature 264 upward. A valve assembly 239 within solenoid valve 211 regulates the flow of hydraulic fluid to a hydraulic actuator based on the position of spool 233.

Figure 2:
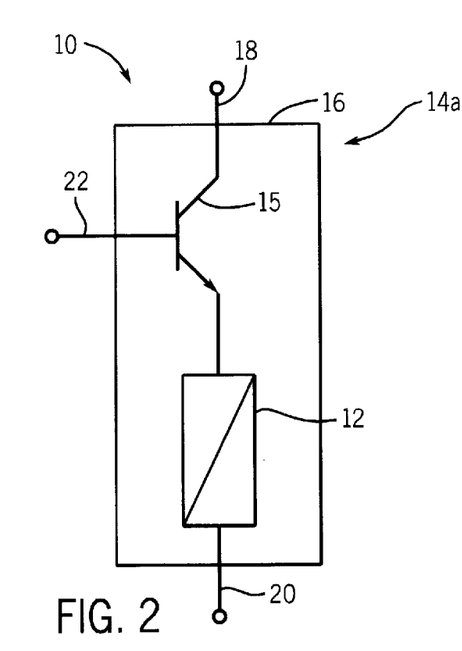
FIG. 2 is a schematic diagram of an embodiment of the single package solenoid of FIG. 1.

Referring now to FIG. 2, an embodiment of solenoid 10 is shown. In this embodiment, control circuit 14a includes a transistor 15 (e.g., a bipolar junction transistor). Transistor 15 is configured to operate in its linear operating region such that the current provided to solenoid coil 12 is proportional to the magnitude of the control signal received on terminal 22. To this end, various support circuitry may be included within package 16 or the control signal may be amplified or otherwise configured to drive transistor 15 in its linear operating region.

Figure 3:
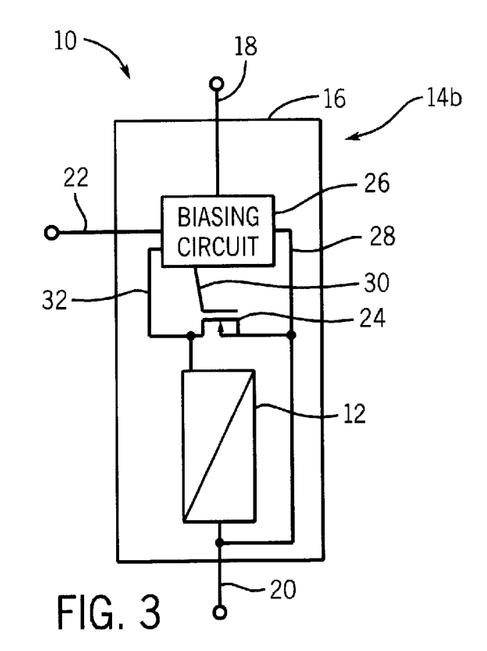
FIG. 3 is a schematic diagram of another embodiment of the single package solenoid of FIG. 1.

Referring now to FIG. 3, another embodiment of solenoid 10 is shown. In this embodiment, control circuit 14b includes a metal oxide semiconductor field effect transistor 24 (MOSFET) and a biasing circuit 26. Biasing circuit 26 is coupled to terminals 18, 20, and 22. Biasing circuit 26 is further coupled to the drain 28, gate 30, and source 32 of MOSFET 24. Source 32 is coupled to one end of solenoid coil 12 and drain 28 is coupled to the other end of solenoid coil 12 and also to terminal 20. Biasing circuit 26 includes various circuit elements required to bias MOSFET 24 such that MOSFET 24 provides current through solenoid coil 12 in proportional response to the control signal received on control terminal 22. While several embodiments of control circuit 14 are disclosed with reference to FIGS. 1, 2, and 3, control circuit 14 may comprise these or other components (e.g., an operational amplifier, etc.), provided the components are suitable for inclusion within or couplable to package 16.

Figure 4:
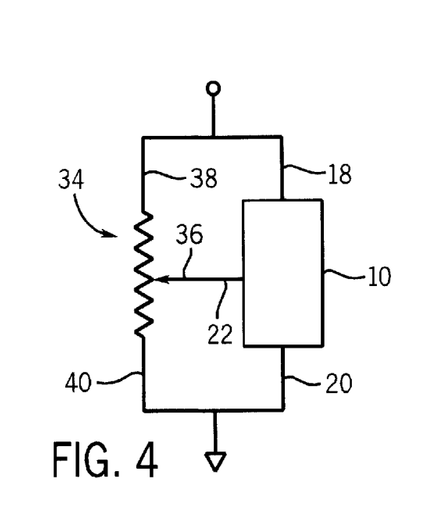
FIG. 4 is a schematic diagram of a single package solenoid in an exemplary application.

Referring now to FIG. 4, some advantages of solenoid 10 are illustrated with reference to an exemplary application. A potentiometer 34 is coupled to solenoid 10 to provide a control signal to solenoid 10. A wiper 36 of potentiometer 34 is coupled to control terminal 22. The remaining two terminals 38, 40 of potentiometer 34 are coupled to power terminal 18 and ground terminal 20 of solenoid 10, respectively, which are then coupled to a power source and a ground, respectively (not shown). Wiper 36 of potentiometer 34 is controlled by any of a number of input devices, such as, an operator input device (e.g., a dial, a position transducer, etc.), or a sensor mounted on a moveable implement (e.g., a harvester header, hitch, work implement, etc.). As the input device adjusts wiper 36, potentiometer 34 generates a control signal on control terminal 22 which controls the solenoid coil within solenoid 10 proportionally. Thus, it can be seen that proportional control of solenoid 10 can be provided in response to a control signal without the need for an external microcontroller or other complex external control circuitry. In this exemplary embodiment, the control signal will affect the rate of change of movement of the core within the solenoid as well as the position of the core. The rate of change of movement will depend on the system geometry and other system constraints. For example, if the solenoid is used to drive a valve for a hydraulic system, the rate of change will depend on whether the hydraulic system includes pressure- or flow-based hydraulics.

Figure 5:
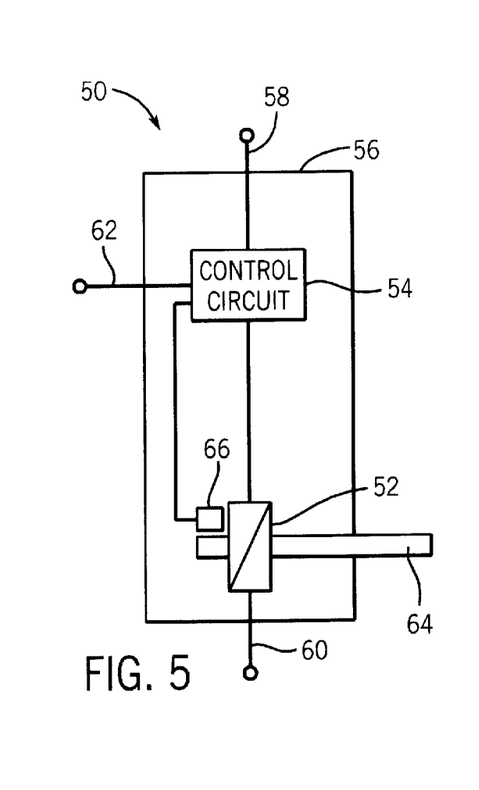
FIG. 5 is a schematic diagram of a single package solenoid according to an alternative embodiment.

Referring now to FIG. 5, an alternative embodiment of solenoid 10 will now be described. Solenoid 10 (FIG. 1) is shown in an open loop configuration. As the core of solenoid 10 begins to shift in response to the driving current, the forces of inertia and friction must be overcome. Immediately after the spool begins to accelerate from rest, momentum accumulates as the velocity increases. Too much momentum may overshoot the intended response of the control signal received on control terminal 22. To compensate for this potential overshoot, the improvement shown in FIG. 5 incorporates position feedback. Thus, solenoid 50 includes a position transducer 66 for feedback. Solenoid 50 includes a solenoid coil 52, control circuit 54, package 56, power terminal 58, ground terminal 60, and control terminal 62 in similar configuration to that of solenoid 10. FIG. 5 further depicts a core 64 slidable within solenoid coil 52. As core 64 slides within solenoid coil 52, position transducer 66 is configured to determine the position of core 64, generate a core position signal, and transmit the core position signal to control circuit 54. Control circuit 54 is configured to control the current to solenoid coil 52 based on the core position signal to provide closed loop control. Closed loop control provides improved speed and accuracy in solenoid control.

Figure 6:
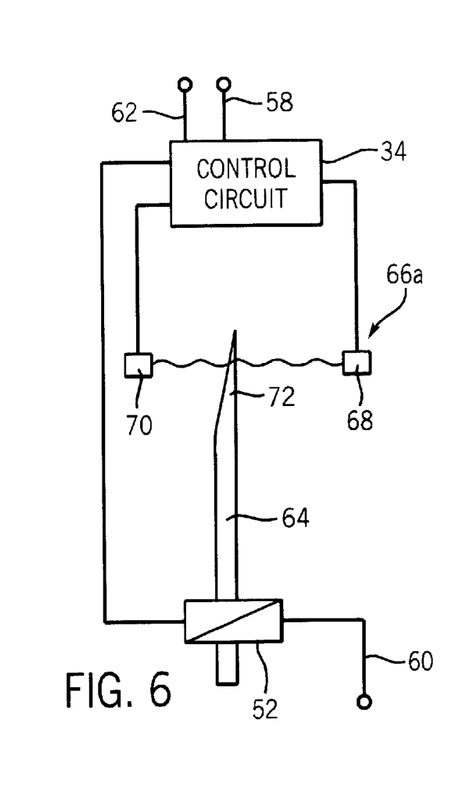
FIG. 6 is a schematic diagram of an embodiment of the single package solenoid of FIG. 5.

Referring now to FIG. 6, an exemplary position transducer is shown. Position transducer 66a includes an optical emitter 68 (e.g., a light emitting diode, infrared transmitter, etc.) and an optical receiver 70. Core 64 is shown having a tapered end 72. As core 64 moves in one direction, a larger amount of tapered end 72 interferes with the light traveling from optical emitter 68 to optical receiver 70. Optical receiver 70 generates a core position signal based on the amount of light received from optical receiver 70 and transmits this core position signal to control circuit 54 for further processing. Naturally, this is one exemplary position transducer configuration and other alternative systems are contemplated. For example, position transducers 66, 66a may alternatively include a resistive sensor, capacitive sensor, other sensing device, or some combination thereof.

Figure 7:
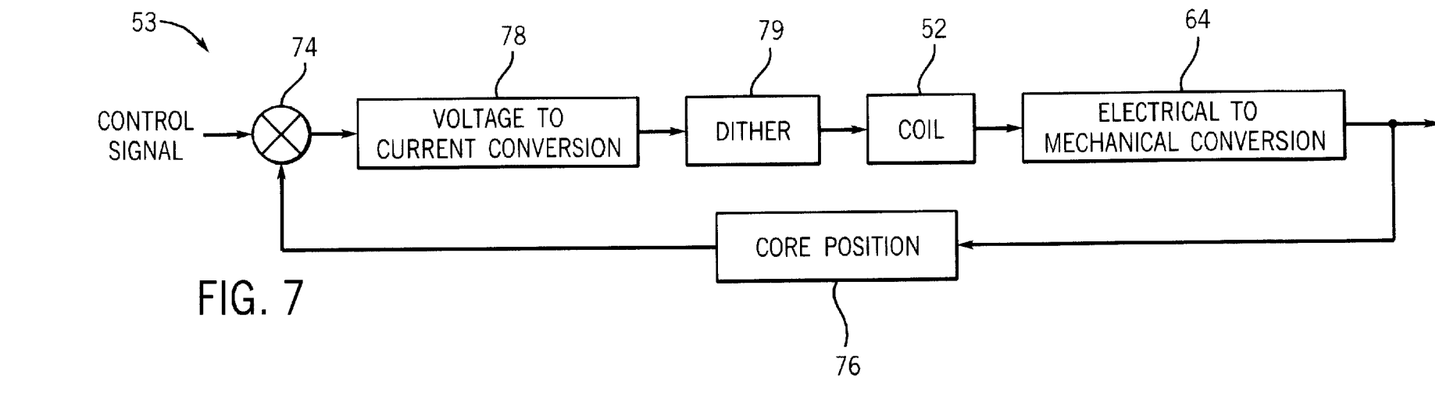
FIG. 7 is a block diagram of a control flow operable in the single package solenoid of FIG. 5.

Referring now to FIG. 7, a flow diagram 53 of the operation of control circuit 54 according to an exemplary embodiment is disclosed. Control circuit 54 may include any type of analog or digital control circuitry, or may include a small controller (e.g., an object-oriented programmable integrated circuit or OOPIC, etc.). In this exemplary control operation, a control signal is received at a mixer 74 where an actual core position signal 76 (e.g., a core feedback position) is subtracted therefrom. The difference signal is provided to a voltage to current converter 78 and then is dithered at a dithering step 79 by providing a small amount of oscillation (e.g., 100 Hertz, etc.) to assist the control in overcoming friction. This dithered signal is provided to solenoid coil 52 which converts the electrical control signal to mechanical movement via core 64. The actual core position 76 is provided as a closed loop feedback to mixer 74.

Figure 8:
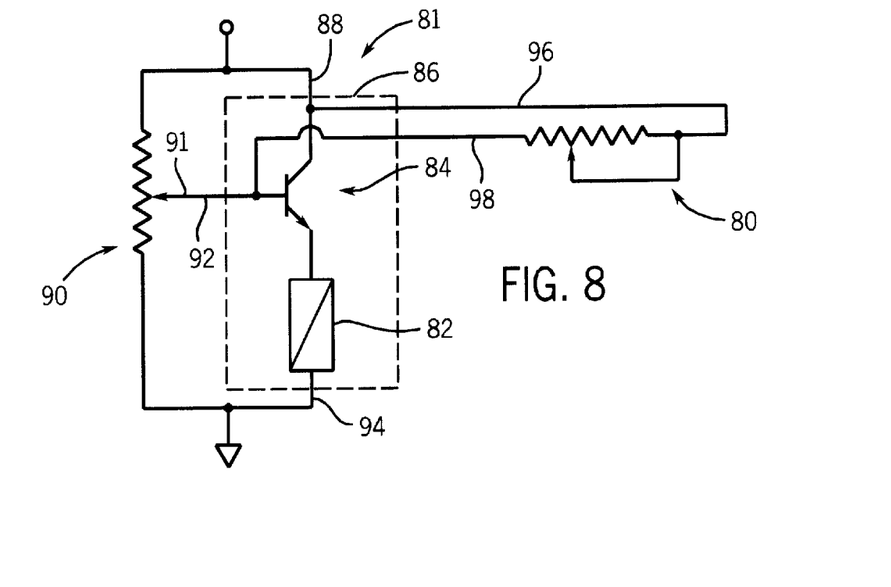
FIG. 8 is a schematic diagram of a single package solenoid according to yet another alternative embodiment.

Referring now to FIG. 8, another alternative embodiment of solenoid 10 is shown in an exemplary application. In FIG. 8, a potentiometer 80 is provided external to a package 86 of solenoid 81, wherein package 86 contains a control circuit 84 coupled to a solenoid coil 82. A position transducer 90 (e.g., a potentiometer) having a wiper 91 is coupled to a control terminal 92 of solenoid 81. The other two terminals of position transducer 90 are coupled to power terminal 88 and ground terminal 94 of solenoid 81. Control circuit 84 includes a bipolar junction transistor. Solenoid 81 includes terminals 96 and 98 coupled to opposite ends of potentiometer 80. Terminals 96 and 98 are coupled to the collector and base, respectively, of the transistor. The collector of the transistor is further coupled to a power terminal 88 and the emitter of the transistor is coupled through solenoid coil 82 to ground terminal 94. Potentiometer 80 is operable to adjust the rate of movement of the core of solenoid 81 in response to a rate signal received, for example, from an operator-controlled rate adjust input device. Position transducer 90 provides closed loop control of the movement of the core based on a sensed position of the core. In one exemplary application, potentiometer 80 is coupled to an operator-controlled rate adjust input device in a cab of a work vehicle, and position transducer 90 is coupled to a work implement. Position transducer 90 receives the position of the work implement with respect to ground and the operator in the cab has the ability to modify the rate of motion using the operator-controlled rate adjust input device coupled to potentiometer 80.

Figure 9:
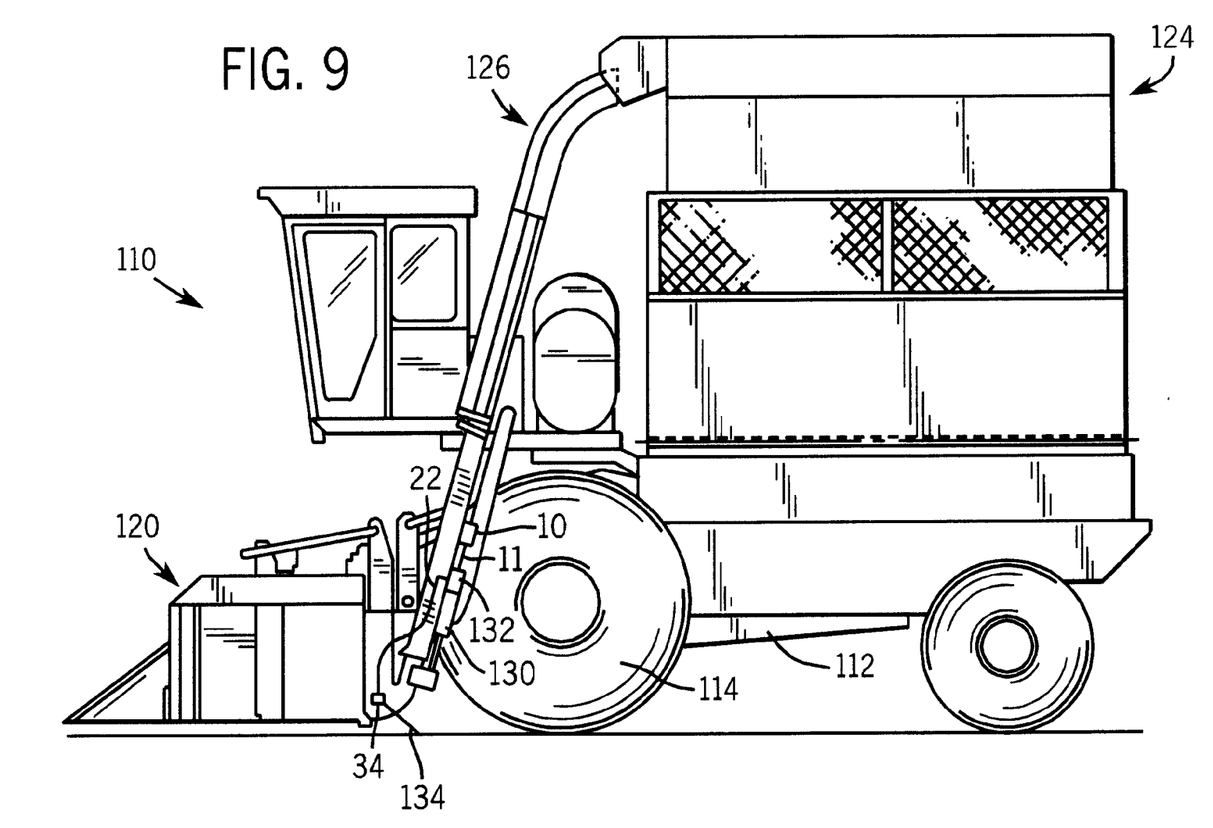
FIG. 9 is a diagram of a cotton picker utilizing a single package solenoid according to an exemplary embodiment.

Referring now to FIG. 9, a cotton picker 110 is shown as an exemplary application for solenoid 10. Cotton picker 110 includes a body 112, wheels 114, 116 in engagement with the ground, and a header 120. Header 120 receives cotton plants, removes cotton from the plants, and passes the cotton through a chute 126 into a bin 124. Header 120 is positioned at a predetermined height with respect to the ground via hydraulic actuator 130. Solenoid 10 is mounted near actuator 130 and is configured to provide movement via core 11 to a hydraulic valve 132. Valve 132 provides hydraulic fluid to hydraulic actuator 130 based on the position of core 11. Hydraulic actuator 130 then adjusts the height of header 120 with respect to the ground in response to the amount of hydraulic fluid received. A potentiometer 34 is provided with a flapper or shoe 134 biased toward engagement with the ground. Potentiometer 34 generates a position signal based on the position of the flapper and provides this position signal as a control signal to control terminal 22 of solenoid 10. Thus, if cotton picker 110 approaches a hill and the distance between the ground and header 120 decreases, flapper 134 moves upward such that this decrease is represented in the control signal provided to solenoid 10. Control circuit 14 (see FIG. 1) of solenoid 10 then adjusts the flow of current to solenoid coil 12 so as to retract core 11 proportionally to the control signal received on control terminal 22, thus maintaining the predetermined height of header 120 with respect to the ground.

Figure 10:
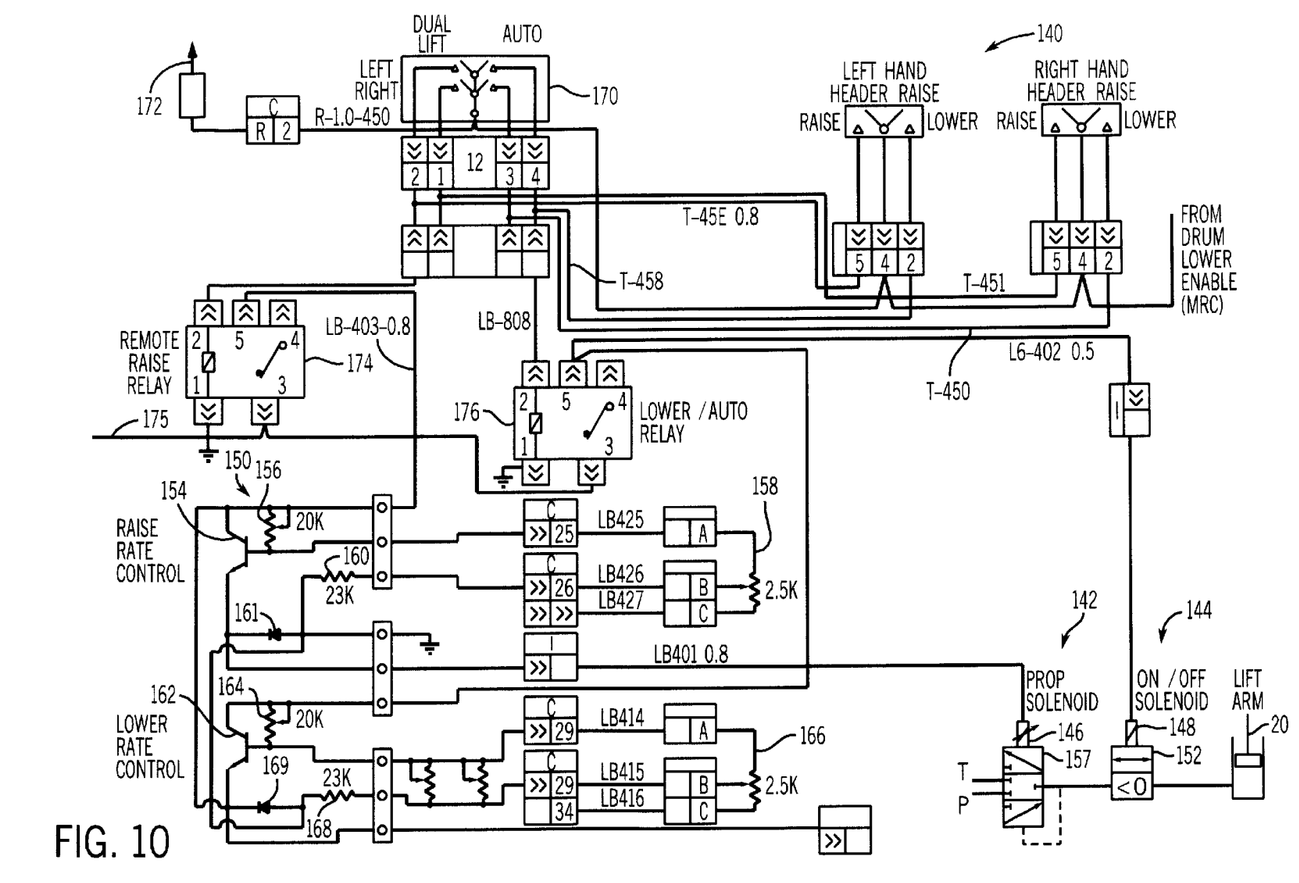
FIG. 10 is a schematic diagram of a header raise/lower circuit utilizing a control circuit according to an exemplary embodiment.

Referring now to FIG. 10, a schematic diagram of a header raise/lower circuit 140 is shown as an exemplary application of solenoid 81. Circuit 140 is a test circuit implementation for a header raise/lower circuit for use on a cotton picker. Circuit 140 includes a proportional solenoid 142 and an ON/OFF solenoid 144, each having a respective solenoid coil 146, 148. Proportional solenoid 142 is a five-terminal, single-package solenoid similar to that shown in FIG. 8 having a control circuit 150 within the single package. Two solenoids are used in this exemplary application since the system is designed for a dual-solenoid hydraulic system having a proportional hydraulic valve 151 and an ON/OFF hydraulic valve 152. Control circuit 150 operates per the following truth table to provide the stated voltages to solenoids 142 and 144 to drive lift arm in the stated direction.

| MODE | PROPORTIONAL SOLENOID | ON/OFF SOLENOID |
| --- | --- | --- |
| LIFT | 7–12 VOLTS | DON'T CARE |
| OFF | GND (OFF) | GND (OFF) |
| AUTO/LOWER | <7 VOLTS | 12 VOLTS |

Thus, when the operator selects LIFT mode, control circuit 150 provides 7–12 volts to proportional solenoid 142 to lift a lift arm 200. When the operator selects OFF mode, no voltage is applied to either solenoid 142 or solenoid 144 and lift arm 200 remains stationary. When the operator selects AUTO/LOWER mode, control circuit 150 provides less than seven volts to proportional solenoid 142 and 12 volts to ON/OFF solenoid 144 to move lift arm 200 downward. Control circuit 150 is described more specifically below.

Control circuit 150 includes a transistor 154 having its base terminal coupled to its collector terminal through a potentiometer 156, shown as a 20 kOhm potentiometer, the position of potentiometer 156 operable via a raise rate input device (e.g., an operator-actuated knob) to adjust the raise rate of the header. A potentiometer 158, shown as a 2.5 kOhm potentiometer, acts as a position transducer to provide a signal indicative of the position of a lift arm (coupled between the cotton picker and the header) to control circuit 150. One terminal of potentiometer 158 is coupled to the base of transistor 154 and the wiper of potentiometer 158 is coupled through a 2.3 kOhm resistor 160 to ground and through the anode of a diode 161 to the emitter of transistor 154. The emitter of transistor 154 is coupled to solenoid coil 146.

Control circuit 150 further includes a transistor 162 having its base terminal coupled to its collector terminal through a potentiometer 164, shown as a 20 kOhm potentiometer, the position of potentiometer 164 operable via a lower rate input device (e.g., an operator-actuated knob) to adjust the lower rate of the header. A potentiometer 166, shown as a 2.5 kOhm potentiometer, acts as a position transducer to provide a signal indicative of the position of the header with respect to ground to control circuit 150. One terminal of potentiometer 166 is coupled to the base of transistor 162 and the wiper of potentiometer 166 is coupled through a 2.3 kOhm resistor to ground and through a diode 169 to the emitter of transistor 162. The emitter of transistor 162 is coupled to the collector of transistor 154. Thus, current is sourced through transistor 162 and through transistor 154 and provided to solenoid coil 146.

In operation, when the operator actuates a dual lift/auto switch 170 to the dual lift position, current is provided from a 12 Volt power source 172 through switch 170 to a relay 174 which provides power from a second power source 175 to the collector of transistor 154 to provide 7–12 Volts across proportional solenoid coil 146 which actuates proportional hydraulic valve 151 to raise a lift arm 200. The current is variable based on raise rate potentiometer 156 and lift arm position potentiometer 158. When the operator actuates the dual lift/auto switch 170 to the auto (i.e., lower) position, current is provided from power source 172 to a lower/auto relay 176 which provides power from second power source 175 to ON/OFF solenoid 144 and to the collector of transistor 162. A voltage drop occurs across transistor 162. The current output by transistor 162 is varied based on potentiometer 166 and lower rate potentiometer 164 before being provided to the collector of transistor 154. Transistor 154 provides the current to control proportional solenoid 142.

While the embodiments illustrated in the FIGURES and described above are presently preferred, it should be understood that these embodiments are offered by way of example only. While control circuit 14 is shown in several exemplary embodiments as including a transistor 15, a MOSFET 24 and biasing circuit 26, etc., control circuit 14 may comprise alternative circuit elements configured to provide the necessary control of power to solenoid coil 12. Furthermore, solenoid 10 is shown in an exemplary application in FIGS. 9, 10, and 11, but one of ordinary skill in the art will find many applications for the various solenoids taught herein. The invention is not limited to a particular embodiment, but extends to various modifications that nevertheless fall within the scope of the appended claims.

What is claimed is:

1. In an agricultural vehicle having a crop-engaging header attached thereto and movable relative to the ground surface by the expansion and contraction of at least one hydraulic cylinder interconnecting said vehicle and said header, said agricultural vehicle including an electromechanical control system for raising and lowering said header in response to changing field conditions sensed by said control system to meet operational parameters established by an operator, the improvement comprising:

a transducer coupled to said header and configured to sense the position of said header with respect to the ground surface and to generate a header position signal;

a single package solenoid comprising:
a package, a solenoid configured to adjust the position of said header by activating said hydraulic cylinder;
a control circuit coupled to said solenoid and having a control terminal coupled to said transducer, said control circuit configured to power said solenoid in proportional response to said header position signal received on said control terminal; and
wherein said solenoid and said control circuit are contained in said package.

2. The improvement of claim 1, wherein:
said solenoid further including a power terminal configured to receive a power signal, and a ground terminal configured for coupling to a ground;
said control circuit coupled to said power terminal and said ground terminal and configured to further generate a magnetic field having a magnitude based on said header position signal;
a core connected to said hydraulic cylinder to activate said hydraulic cylinder and operable in response to said magnetic field.

3. The improvement of claim 2, further comprising:
a core position feedback transducer coupled to said control circuit and configured to generate a core position feedback signal representative of the position of said core, said control circuit further configured to power said solenoid based on the core position feedback signal.

4. The improvement of claim 3, wherein:
said core position feedback transducer is contained in said package.

* * * * *